US012577334B2

(12) United States Patent
Holtcamp et al.

(10) Patent No.: US 12,577,334 B2
(45) Date of Patent: Mar. 17, 2026

(54) BROAD ORTHOGONAL DISTRIBUTION POLYETHYLENES FOR FILMS

(71) Applicant: ExxonMobil Chemical Patents Inc., Baytown, TX (US)

(72) Inventors: Matthew W. Holtcamp, Huffman, TX (US); Dongming Li, Houston, TX (US); Kevin A. Stevens, Houston, TX (US); Laughlin G. McCullough, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 825 days.

(21) Appl. No.: 17/757,000

(22) PCT Filed: Nov. 18, 2020

(86) PCT No.: PCT/US2020/060995
§ 371 (c)(1),
(2) Date: Jun. 7, 2022

(87) PCT Pub. No.: WO2021/126449
PCT Pub. Date: Jun. 24, 2021

(65) Prior Publication Data

US 2023/0022149 A1 Jan. 26, 2023

Related U.S. Application Data

(60) Provisional application No. 62/949,266, filed on Dec. 17, 2019.

(51) Int. Cl.
*C08F 210/16* (2006.01)
*C08J 5/18* (2006.01)

(52) U.S. Cl.
CPC ............... *C08F 210/16* (2013.01); *C08J 5/18* (2013.01); *C08F 2420/07* (2021.01); *C08J 2323/08* (2013.01)

(58) Field of Classification Search
CPC ... C08F 210/16; C08F 4/65925; C08F 4/7042
See application file for complete search history.

(56) References Cited

U.S. PATENT DOCUMENTS 6,242,545 B1 6/2001 Jejelowo et al.
6,248,845 B1 6/2001 Loveday et al.
6,528,597 B2 3/2003 Loveday et al.
6,828,394 B2 12/2004 Vaughan et al.
6,936,675 B2 8/2005 Szul et al.
6,956,088 B2 10/2005 Farley et al.
7,119,153 B2 10/2006 Jensen et al.
7,172,816 B2 2/2007 Szul et al.
7,179,876 B2 2/2007 Szul et al.
7,381,783 B2 6/2008 Loveday et al.
7,547,754 B2 6/2009 McDaniel et al.
7,572,875 B2 8/2009 Jensen et al.
7,625,982 B2 12/2009 Martin et al.
8,247,065 B2 8/2012 Best et al.
8,378,043 B2 2/2013 Graham et al.
8,383,754 B2 2/2013 Yang et al.
8,476,392 B2 7/2013 Kolb et al.
8,691,715 B2 4/2014 Yang et al.
8,722,567 B2 5/2014 Slawiniski
8,846,841 B2 9/2014 Yang et al.
8,940,842 B2 1/2015 Yang et al.
9,006,367 B2 4/2015 McDaniel et al.
9,096,745 B2 8/2015 Lam et al.
9,115,229 B2 8/2015 Slawiniski
9,181,369 B2 11/2015 Tso et al.
9,181,370 B2 11/2015 Sukhadia et al.
9,217,049 B2 12/2015 Yang et al.
9,290,593 B2 3/2016 Cho et al.
9,334,350 B2 5/2016 McDaniel et al.
9,447,265 B2 9/2016 Lam et al.
9,850,332 B2 12/2017 Lue et al.
9,975,974 B2 5/2018 Mariott et al.
10,155,830 B2 12/2018 Kim et al.
10,266,626 B2 4/2019 Sung et al.
10,344,102 B2 7/2019 Kim et al.
10,494,462 B2 12/2019 Kuhlman
10,570,532 B2 2/2020 Bae et al.
10,723,819 B2 7/2020 Holtcamp et al.
10,808,053 B2 10/2020 Li et al.
10,822,434 B2 * 11/2020 Holtcamp .................. C08J 5/18
10,865,258 B2 * 12/2020 Holtcamp ............. C08F 4/6465
10,926,250 B2 * 2/2021 Holtcamp ............. B01J 31/143
10,927,203 B2 2/2021 Lue et al.
10,934,376 B2 * 3/2021 Li .............................. C08J 5/18
11,046,796 B2 6/2021 Li et al.
11,130,827 B2 * 9/2021 Li .......................... H01B 3/307
11,274,196 B2 * 3/2022 Li ....................... C08F 4/65925
11,712,687 B2 * 8/2023 Holtcamp ............. C08F 210/14
502/155
11,787,881 B2 * 10/2023 Silva ..................... C08F 210/16
526/170
2009/0156764 A1 6/2009 Malakoff et al.
2010/0121006 A1 5/2010 Cho et al.
2015/0291748 A1 10/2015 Malakoff
2016/0347889 A1 12/2016 Lue et al.
2018/0134828 A1 5/2018 Doufas et al.
2018/0237554 A1 8/2018 Holtcamp et al.
2019/0040168 A1 2/2019 Holtcamp et al.
2019/0119413 A1 4/2019 Holtcamp et al.
(Continued)

FOREIGN PATENT DOCUMENTS

CN 110325561 A * 10/2019 ............ C08F 210/16
CN 111212857 A * 5/2020 ............ C08F 210/16
(Continued)

*Primary Examiner* — Rip A Lee
(74) *Attorney, Agent, or Firm* — C. Tumey Law Group PLLC

(57) ABSTRACT

A polyethylene suitable for use in blown film can comprise ethylene derived units and $C_3$ to $C_{12}$ α-olefin derived units at 0.5 wt % to 10 wt % of the polyethylene and have a reversed-co-monomer index (RCI,m) of 35 to 100, a comonomer distribution ratio (CDR-2,m) of 1.20 to 1.80, and a weight average molecular weight (Mw) to number average molecular weight (Mn) of 5 to 7.

17 Claims, No Drawings

(56) References Cited

U.S. PATENT DOCUMENTS

| | | | | |
|---|---|---|---|---|
| 2019/0161567 | A1* | 5/2019 | Li | C08J 5/18 |
| 2019/0256696 | A1 | 8/2019 | Chandak et al. | |
| 2019/0284312 | A1* | 9/2019 | Holtcamp | C08F 4/65927 |
| 2019/0389988 | A1 | 12/2019 | Ye et al. | |
| 2020/0231790 | A1* | 7/2020 | Li | C08F 210/16 |
| 2021/0023540 | A1 | 1/2021 | Holtcamp et al. | |
| 2021/0054111 | A1* | 2/2021 | Holtcamp | C08F 4/65925 |

FOREIGN PATENT DOCUMENTS

| | | | | |
|---|---|---|---|---|
| EP | 2931763 B1 | | 1/2018 | |
| WO | WO-2019027587 A1 | * | 2/2019 | C08F 210/02 |
| WO | 2019-0108327 | | 6/2019 | |
| WO | WO-2019108314 A1 | * | 6/2019 | C08F 210/16 |
| WO | WO-2019108977 A1 | * | 6/2019 | C08L 23/0815 |
| WO | WO-2020096645 A1 | * | 5/2020 | C07F 17/00 |

* cited by examiner

BROAD ORTHOGONAL DISTRIBUTION POLYETHYLENES FOR FILMS

CROSS-REFERENCE OF RELATED APPLICATIONS

This application is a National Phase Application claiming priority to PCT Application Serial No. PCT/US2020/060995, filed Nov. 18, 2020, which claims the benefit of U.S. Provisional Application 62/949,266, filed Dec. 17, 2019 entitled "Broad Orthogonal Distribution Polyethylenes for Films", the entireties of which is are incorporated by reference herein.

FIELD

The present invention relates to polyethylene compositions suitable for use in blown film.

BACKGROUND

The present disclosure relates to polyethylenes useful for films.

A trade-off exists among various performance attributes that has been a major hurdle in the development of new polyethylene product technologies. Among such performance attributes are a combination of stiffness, toughness, processability, and optical properties, all of which are important for most of linear low density polyethylene (LLDPE) film applications. However, it is difficult to achieve all of these attributes in one composition because improving toughness often reduces processability and increasing stiffness may cause optical properties to suffer.

SUMMARY OF THE INVENTION

The present disclosure relates to polyethylenes useful for films and in particular to films made from polyethylenes that have a broad orthogonal composition (or comonomer) distribution (BOCD).

A first embodiment is a method comprising: reacting ethylene, a $C_3$ to $C_{12}$ $\alpha$-olefin comonomer, and hydrogen in the presence of a mixed catalyst to form polyethylene comprising ethylene derived units and $C_3$ to $C_{12}$ $\alpha$-olefin derived units at 0.5 wt % to 10 wt % of the polyethylene and having a reversed-co-monomer index (RCI,m) of 35 to 100, a comonomer distribution ratio (CDR-2,m) of 1.20 to 1.80, and a weight average molecular weight (Mw) to number average molecular weight (Mn) of 5 to 7; wherein the mixed catalyst comprises Compound I and Compound II or III in a Compound I to Compound II or III mole ratio of 70:30 to 90:10 (each compound is provided within the Detailed Description).

Another embodiment is a film comprising: polyethylene comprising ethylene derived units and $C_3$ to $C_{12}$ $\alpha$-olefin derived units at 0.5 wt % to 10 wt % of the polyethylene; and having a reversed-co-monomer index (RCI,m) of 35 to 100, a comonomer distribution ratio (CDR-2,m) of 1.20 to 1.80, and a weight average molecular weight (Mw) to number average molecular weight (Mn) of 5 to 7; wherein the film has a 1% Secant flexure modulus in a machine direction (MD) of 25,000 psi to 45,000 psi, an Elmendorf tear in the MD of 200 g to 350 g, and a Dart Drop value of 200 g/mil to 1,000 g/mil.

Yet another embodiment is a composition comprising: polyethylene comprising ethylene derived units and $C_3$ to $C_{12}$ $\alpha$-olefin derived units at 0.5 wt % to 10 wt % of the polyethylene and having a reversed-co-monomer index (RCI,m) of 35 to 100, a comonomer distribution ratio (CDR-2,m) of 1.20 to 1.80, and a weight average molecular weight (Mw) to number average molecular weight (Mn) of 5 to 7.

DETAILED DESCRIPTION

The present disclosure relates to polyethylenes useful for films and in particular to films made from polyethylenes that have a BOCD.

Without being limited by theory, it is believed that the trade-offs in performance attributes described above can be significantly overcome by tailoring the molecular weight and comonomer distribution in the polyethylene product. The present invention includes a polyethylene produced from mixed-catalyst systems. More specifically, the mixed-catalyst system includes a metallocene catalyst and an iron catalyst. The metallocene catalyst incorporates a comonomer into the polyethylene to a greater extent than the iron catalyst. Accordingly, the polyethylene population produced from the metallocene catalyst has a lower density than the polyethylene population produced from the iron catalyst. The resultant overall polyethylene product has a BOCD polyethylene product that has a combination of (1) a low weight average molecular weight (Mw) and high density population of polyethylene chains and (2) a high Mw and low density population of polyethylene chains, which achieves a combination of desirable performance attributes.

The lower density BOCD-type polyethylenes described herein is a polyethylene product that is multimodal in both molecular weight and short chain branching. This is accomplished using a combined catalyst system wherein a poor-comonomer incorporating catalyst is combined with a high-comonomer incorporating catalyst in a gas phase process to produce the multimodal polyethylene having the desired BOCD. Such polyethylenes are highly useful in forming films such as cast or blown films, especially blown films formed by melt extrusion of the polyethylene into a sheet or cylindrical/tubular form and exposed to positive air pressure against the forming film to expand the sheet in the transverse and machine directions (TD and MD), with or without some machine direction (MD) tension, stretching the material before or during cooling. The inventive polyethylenes are also useful in extrusion coating applications.

As used herein, the term "film" refers to a continuous, flat, preferably flexible, polymeric structure having an average thickness within a range from 0.1 μm to 250 μm, alternatively 10 μm to 200 μm, alternatively 15 μm to 100 μm, alternatively, 0.1 μm to 60 μm, or alternatively 1 μm to 40 μm, or such a coating of similar thickness adhered to a flexible, non-flexible or otherwise solid structure. The "film" may comprise one layer, or multiple layers, each of which may comprise the inventive polyethylene. For example, one or more layers of a "film" may include a mixture of the polyethylene as well as a LDPE, another LLDPE, polypropylene homo- and copolymers, or a plastomer (high comonomer polyethylene). Desirable uses for such films include labeling and packaging applications and stretch and cling films for wrapping around articles of commerce.

As used herein, when a polymer is referred to as comprising a monomer, the monomer is present in the polymer in the polymerized form of the monomer or in the derivative form of the monomer. The term "derived units" as used herein, refers to the polymerized form of the monomer from which the polymer was derived. For example, when a polymer is said to have an "ethylene" content of 95 wt % to 99.5 wt %, it is understood that the mer unit in the polymer is derived from ethylene in the polymerization reaction and said derived units are present at 95 wt % to 99.5 wt %, based upon the weight of the polymer.

Test Methods

TABLE 1

| Test Name | Method or Description |
|---|---|
| Melt Index ($I_2$) | ASTM D1238-13 at 2.16 kg and 190° C. |
| High Load Melt Index ($I_{21}$) | ASTM D1238-13 at 21.6 kg and 190° C. |
| Density | ASTM D1505-18, column density, samples were molded under ASTM D4703-10a, Procedure C, then conditioned under ASTM D618-08 (23° C. ± 2° C. and 50% ± 10% relative humidity) for 40 hours before testing. |
| Weight Average Molecular Weight (Mw) | 4-dimensional gel permeation chromatography (4D GPC) (see below) |
| Number Average Molecular Weight (Mn) | 4D GPC (see below) |
| Z-Average Molecular Weight (Mz) | 4D GPC (see below) |
| Long Chain Branching (LCB) | determined with intrinsic viscosity ($g'_{vis}$) 4D GPC (see below) |
| Unsaturations in polymer | 1H NMR as described in 38 MACROMOLECULES 6988 (2005), and 47 MACROMOLECULES 3782 (2014) (see 1H NMR description below) |
| 1% Secant flexure modulus | ASTM D882-18, 15 mm width strip |
| Modulus | ASTM D882-18, 15 mm width strip |
| Yield Strength | ASTM D882-18, 15 mm width strip |
| Tensile Strength | ASTM D882-18, 15 mm width strip |
| Elongation at Break | ASTM D882-18, 15 mm width strip |
| Elongation at Yield | ASTM D882-18, 15 mm width strip |
| Dart Drop | ASTM D1709-16ae1, Phenolic, Method A |
| Haze | ASTM D1003-13 |
| Gloss, 45° | ASTM D2457-13 |
| Elmendorf Tear | ASTM D1922-15 with conditioning for 40 hours at 23° C. ± 2° C. and 50% ± 10% relative humidity |
| Puncture | Modified ASTM D5748: ASTM probe was used with two 0.25 mil HDPE slip sheets. Machine Model: United SFM-1. Testing speed: 10 in/min |
| Heat Seal | Method using 1 inch film strip of 1 mil gauge, sealed at various temperatures under 73 psi (0.5N/$mm^2$) for 1 second. Following ASTM conditioning for 40 hours at 23° C. ± 2° C. and 50% ± 10% relative humidity, the sealed specimen were tested in T-joint peel mode at 20 inch/min pulling speed |
| Hot tack | Method using 1 inch film strip of 1 mil gauge, sealed at various temperatures under 73 psi (0.5N/mm2) for 0.5 second. After a 0.4 second delay, the sealed specimen were pulled at 200 mm/speed in T-joint peel mode |

$^1$H NMR: $^1$H NMR data was collected at 393K in a 10 mm probe using a Bruker spectrometer with a 1H frequency of at least 400 MHz (available from Agilent Technologies, Santa Clara, Calif.). Data was recorded using a maximum pulse width of 45° C., 5 seconds between pulses and signal averaging 512 transients. Spectral signals were integrated and the number of unsaturation types per 1,000 carbons was calculated by multiplying the different groups by 1,000 and dividing the result by the total number of carbons. The number average molecular weight (Mn) was calculated by dividing the total number of unsaturated species into 14,000, and has units of g/mol.

4D GPC Methodology: Unless otherwise indicated, the distribution and the moments of molecular weight (Mw, Mn, Mz, Mw/Mn, etc.), the comonomer content ($C_2$, $C_3$, $C_6$, etc.), and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. Given amount of polymer sample is weighed and sealed in a standard vial with 80-µL flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass, which is equal to the pre-determined concentration multiplied by injection loop volume. The conventional molecular weight (IR MW) is determined by combining universal calibration relationship with the column calibration, which is performed with a series of monodispersed polystyrene (PS) standards ranging from 700,000 g/mol to 10,000,000 g/mol. The MW at each elution volume is calculated with following equation:

$$\log M = \frac{\log(K_{PS}/K)}{\alpha + 1} + \frac{\alpha_{PS} + 1}{\alpha + 1}\log M_{PS},$$

where the variables with subscript "PS" stand for polystyrene while those without a subscript are for the test samples. In this method, $\alpha_{PS}$=0.67 and $K_{PS}$=0.000175, while a and K for other materials are as calculated and published in literature (Sun, T. et al. (2001) *Macromolecules*, v. 34, pg. 6812), except that for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in $g/cm^3$, molecular weight is expressed in g/mole, and intrinsic viscosity (hence Kin the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1,000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2=f*\text{SCB}/1000\text{TC}.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1,000TC (bulk $CH_3$ end/1000TC) is obtained by weight-averaging the chain-end correction over the molecular-weight range. Then $$w2b=f*\text{bulk } CH_3/1000\text{TC}$$

$$\text{bulk SCB}/1000\text{TC}=\text{bulk } CH_3/1000\text{TC}-\text{bulk } CH_3 \text{ end}/1000\text{TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, ΔR(θ) is the measured excess Rayleigh scattering intensity at scattering angle θ, c is the polymer concentration determined from the IR5 analysis, $A_2$ is the second virial coefficient, P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as $$g'_{vis} = \frac{[\eta]_{avg}}{KM_v^{\alpha}},$$

where $M_V$ is the viscosity-average molecular weight based on molecular weights determined by LS analysis and the K and α are for the reference linear polymer, which are, for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200w2}{-100n - 2w2 + nw2}.$$

Then the molecular-weight distribution, W(z) where z=$\log_{10}$ M, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1=\int_{-\infty}^{\infty} W'dz$$

and a modified weight-average molecular weight ($M_W'$) is calculated over the effectively reduced range of molecular weights as follows:

$$M_w'=\int_{-\infty}^{\infty} 10^z * W'dz.$$

The RCI,m is then computed as $$\mathrm{RCI},m=\int_{-\infty}^{\infty} x2(10^z - M_w')W'dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w')W'dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)},$$

$$CDR\text{-}2, w = \frac{w2(Mz)}{w2\left(\frac{Mw + Mn}{2}\right)},$$

$$CDR\text{-}3, w = \frac{w2\left(\frac{Mz + Mw}{2}\right)}{w2\left(\frac{Mw + Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)},$$

$$CDR\text{-}2, m = \frac{x2(Mz)}{x2\left(\frac{Mw + Mn}{2}\right)},$$

$$CDR\text{-}3, m = \frac{x2\left(\frac{Mz + Mw}{2}\right)}{x2\left(\frac{Mw + Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

All molecular weights are weight average (Mw) unless otherwise noted. All molecular weights are reported in g/mol unless otherwise noted.

Temperature Rising Elution Fractionation (TREF): Temperature Rising Elution Fractionation (TREF) analysis is done using a CRYSTAF-TREF 200+ instrument from Polymer Char, S. A., Valencia, Spain. The principles of TREF analysis and a general description of the particular apparatus to be used are given in the article Monrabal, B. et al. (2011) "Characterization of Polypropylene-Polyethylene Blends by Temperature Rising Elution and Crystallization Analysis Fractionation," *Analytical and Bioanalytical Chemistry*, v. 399, pp. 1557-1561. FIG. 3 of the article is an appropriate schematic of the particular apparatus used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

1,2-Dichlorobenzene (ODCB) solvent stabilized with approximately 380 ppm of 2,6-bis(1,1-dimethylethyl)-4-methylphenol (butylated hydroxytoluene) is used for preparing the sample solution and for elution. The sample to be analyzed (approximately 25 mg but as low as approximately 10 mg) is dissolved in ODCB (25 ml metered at ambient temperature) by stirring at 150° C. for 60 min. A small volume (0.5 ml) of the solution is introduced into a column (15 cm long by ⅜ inch outer diameter) packed with an inert support (of stainless steel balls) at 150° C., and the column temperature is stabilized at 140° C. for 45 minutes. The sample volume is then allowed to crystallize in the column by reducing the temperature to 30° C. at a cooling rate of 1° C./min. The column is kept at 30° C. for 15 minutes before injecting the ODCB flow (1 ml/min) into the column for 10 minutes to elute and measure the polymer that did not crystallize (soluble fraction). The infrared detector used (Polymer Char IR4) generates an absorbance signal that is proportional to the concentration of polymer in the eluting flow. A complete TREF curve is then generated by increasing the temperature of the column from 30° C. to 140° C. at a rate of 2° C./min while maintaining the ODCB flow at 1 ml/min to elute and measure the dissolving polymer.

The polyethylene compositions of the present invention have two peaks in the TREF measurement, which is described below. Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. In other embodiments, the two distinct peaks are at least 3° C. apart, in other embodiments at least 4° C. apart, and in other embodiments at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicate a bi-modal composition distribution (CD). Bimodal CD may also be determined by other methods known to those skilled in the art. One such alternate method for TREF measurement then can be used if the above method does not show two peaks are disclosed in Monrabal, B. (1994) "Crystallization Analysis Fractionation: A New Technique for the Analysis of Branching Distribution in Polyolefins," *Journal of Applied Polymer Science*, v. 52, pp. 491-499.

The $T_{75}$-$T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}$-$T_{25}$ value represents the difference. The closer these temperatures comes together, the narrower the composition distribution.

Polyethylene

The polyethylene of the present invention can be a combination of (1) a low weight average molecular weight (Mw) and high density population of polyethylene chains and (2) a high Mw and low density population of polyethylene chains. Unless otherwise specified, the polyethylene of the present invention, the polyethylene of the present disclosure, or other variants refers to the total product (i.e., combination of the two foregoing populations of polyethylene chains).

The polyethylene of the present disclosure comprises ethylene derived units and $C_3$-$C_{12}$ α-olefin derived units, where the $C_3$-$C_{12}$ α-olefin derived units are present at 0.5 wt % to 10 wt % of the polyethylene, alternatively at 2 wt % to 8 wt %, or alternatively at 4 wt % to 7 wt %. Preferred $C_3$-$C_{12}$ α-olefins include 1-butene, 1-hexene, and 1-octene.

The polyethylene of the present disclosure can have a density of 0.910 g/cm$^3$ to 0.940 g/cm$^3$, or alternatively 0.920 g/cm$^3$ to 0.930 g/cm$^3$.

The polyethylene of the present disclosure can have an $I_2$ (value of 0.8 g/10 min to 1.5 g/10 min, or alternatively 0.8 g/10 min to 1.3 g/10 min.

The polyethylene of the present disclosure can have an $I_{21}$ value of 15 g/10 min to 25 g/10 min, or alternatively 16 g/10 min to 22 g/10 min.

The polyethylene of the present invention can have an $I_{21}/I_2$ ratio of 15 to 25, or alternatively 16 to 22.

The polyethylene of the present disclosure has a Mw of 80,000 g/mol to 250,000 g/mol, or alternatively 90,000 g/mol to 200,000 g/mol, or alternatively 100,000 g/mol to 180,000 g/mol.

The polyethylene of the present disclosure has a Mn of 10,000 g/mol to 100,000 g/mol, or alternatively 12,000 g/mol to 80,000 g/mol, or alternatively 15,000 g/mol to 60,000 g/mol.

The polyethylene of the present disclosure has a Mz of 210,000 g/mol to 500,000 g/mol, or alternatively 250,000 g/mol to 450,000 g/mol, or alternatively 275,000 g/mol to 400,000 g/mol.

The polyethylene of the present disclosure has a Mw to Mn ratio of 3.0 to 8.0, or alternatively 4.0 to 7.5, or alternatively 5.0 to 7.0, or alternatively 5.0 to 6.5.

The polyethylene of the present disclosure has a Mz to Mn ratio of 8 to 20, or alternatively 10 to 20, or alternatively 10 to 18, or alternatively 16 to 18.

The polyethylene of the present disclosure has a Mz to Mw ratio of 2.0 to 3.0, or alternatively 2.1 to 2.9, or alternatively 2.4 to 2.9, or alternatively 2.3 to 2.8, or alternatively 2.6 to 2.8.

Generally, the polyethylene composition of the present invention is substantially free of long-chain branching, which polymer compositions are characterized by a $g'_{vis}$ proximate to 1.0. $g'_{vis}$ values of greater than 0.9 indicate minimal to no long-chain branching. The polyethylene of the present disclosure can have a $g'_{vis}$ value of 0.9 to 1.1, or alternatively 0.92 to 1.05, or alternatively 0.94 to 1.0, or alternatively 0.95 to 1.0.

The polyethylene of the present disclosure can have a % vinyls (determined by $^1$H NMR) of 60% to 97%, or alternatively 75% to 97%, or alternatively 85% to 97%.

The polyethylene of the present disclosure can have a total unsaturation per 1,000 carbons (determined by $^1$H NMR) of 0.2 to 0.55, or alternatively 0.2 to 0.45.

The polyethylene of the present disclosure has a RCI,m of 35 kg/mol to 100 kg/mol, or alternatively 55 kg/mol to 90 kg/mol, or alternatively 55 kg/mol to 70 kg/mol, or alternatively 70 kg/mol to 90 kg/mol.

The polyethylene of the present disclosure has a CDR-2,m of 1.20 to 1.80, or alternatively 1.30 to 1.70, or alternatively 1.40 to 1.60.

The polyethylene of the present disclosure has a $T_{75}$-$T_{25}$ value of 10° C. to 25° C., or alternatively 15° C. to 18° C.

In these or other embodiments, the polyethylene compositions of the present invention are characterized by a composition distribution breadth $T_{75}$-$T_{25}$, as measured by TREF, of less than 25° C., in other embodiments less than 18° C., and in other embodiments less than 15° C. In one or more embodiments, the polyethylene compositions of this invention have a composition distribution breadth $T_{75}$-$T_{25}$, as measured by TREF, of from about 10 to about 20° C., in other embodiments from about 12 to about 19° C.

Process to Make Polyethylene

In particular embodiments, the unbridged hafnium compound is represented by Compound I:

Compound I

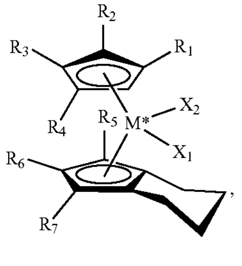

where:

$M^*$ is Hf;

each $R_1$, $R_2$, and $R_4$ is independently hydrogen, alkoxide or a $C_1$ to $C_{40}$ (preferably $C_1$ to $C_{20}$) substituted or unsubstituted hydrocarbyl group;

$R_3$ is —$R_{20}$—$SiR'_3$, where $R_{20}$ a $C_1$ to $C_4$ hydrocarbyl, and each R' is independently hydrogen or a $C_1$ to $C_{20}$ substituted or unsubstituted hydrocarbyl, provided that at least one R' is not hydrogen;

each $R_5$, $R_6$, and $R_7$ is independently hydrogen, alkoxide or a $C_1$ to $C_{40}$ (preferably $C_1$ to $C_{20}$) substituted or unsubstituted hydrocarbyl group; and each $X_1$ and $X_2$ is, independently, a univalent anionic ligand, or $X_1$ and $X_2$ are joined and bound to the metal atom to form a metallocycle ring, or $X_1$ and $X_2$ are joined to form a chelating ligand, a diene ligand, or an alkylidene ligand, where the bridged metallocene is not symmetrical.

The 2$^{nd}$ catalyst can be either Compound II or Compound III:

II

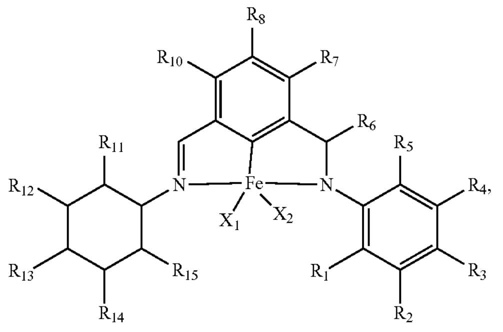

III

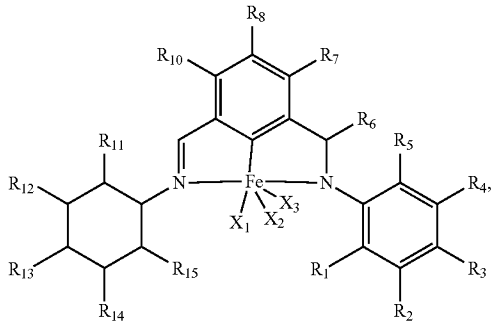

where $R_1$-$R_{15}$ are hydrocarbyls, halogens, or alkoxy moieties, preferably at $R_1$ and $R_{15}$ are a halogen of the type Cl, Br, I. The iron atom may be either a +3, +2 valence state.

For example, the polyethylene of the present disclosure is synthesized using a mixed catalyst that comprises a metallocene catalyst according to Compound IV and an iron catalyst according to Compound V.

Compound IV

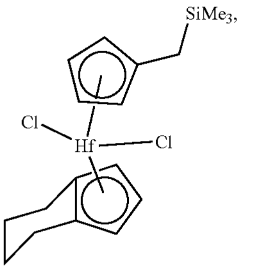

Compound V

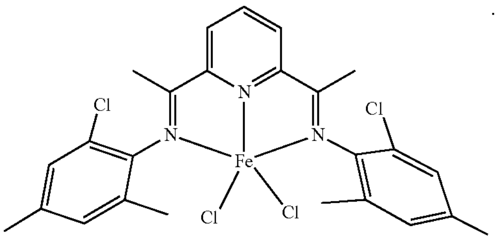

Generally, the metallocene catalyst and iron catalyst are mixed to form a homogeneous suspension of the catalysts, which are then deposited on an inert support. The mole ratio of the metallocene catalyst (Compound I, or more specifically Compound IV) to the iron catalyst (Compound II or III, or more specifically Compound V) can range from 70:30 to 90:10 to 75:25 to 85:15.

The mixed-catalyst system can be absent an activator. As used herein, the term "activator" refers to a compound capable of converting catalyst precursor into an active polymerization catalyst, and preferably includes alkyl alumoxane compounds (e.g., methylalumoxane) and/or tetra (perfluorinated aromatic)borates, but more preferably comprises methylalumoxane.

The inert support preferably comprises silica, for example, amorphous silica, which may include a hydrated surface presenting hydroxyl or other groups that can be deprotonated to form reactive sites to anchor activators and/or catalyst precursors. Other porous support materials may optionally be present with the silica as a co-support, for example, talc, other inorganic oxides, zeolites, clays, organoclays, or any other organic or inorganic support material and the like, or mixtures thereof. Silicas that may be suitable are commercially available under the trade designations PD 14024 (PQ Corporation), D70-120A (Asahi Glass Co., Ltd. or AGC Chemicals Americas, Inc.), and the like.

The inert support is preferably dry, that is, free of absorbed water. Drying of the inert support may be effected by heating or calcining at 130° C. to 850° C., or alternatively 200° C. to 600° C., for a time of 1 minute to 100 hours, alternatively 12 hours to 72 hours, or alternatively 24 hours to 60 hours. The calcined support material may comprise at least some groups reactive with an organometallic compound, for example, reactive hydroxyl (OH) groups to produce the supported catalyst systems of this invention.

The polyethylene can be produced in any known process such as a slurry (in solution) process, such as in so-called "loop" reactors that are well known in the art, or in a gas phase reactor, especially a fluidized bed gas phase reactor wherein monomer and other gases are recirculated through a bed of polymer. The polyethylene is preferably produced in a gas phase process at a gas velocity of 1 ft/sec to 4 ft/sec, or alternatively 1 ft/sec to 2 ft/sec. Such processes are well known in the art and the process for making the polyethylene is not otherwise particularly limited.

The polyethylene of the present disclosure can be produced in a single-reactor process, wherein the monomers contact the catalysts in only one reactor to produce the polyethylene, or a dual-reactor process where the monomers contact the catalysts in two or more reactors in parallel or series, but most preferably a single-reactor process.

Processes for producing the polyethylene of the present disclosure generally include reacting ethylene, a $C_3$-$C_{12}$ $\alpha$-olefin comonomer, and hydrogen in the presence of the mixed catalyst.

The reaction temperature for producing the polyethylene of the present disclosure can be 150° F. (66° C.) to 200° F. (93° C.), or alternatively 170° F. (77° C.) to 190° F. (88° C.).

The reactor pressure while producing the polyethylene of the present disclosure can be 200 psig to 400 psig, or alternatively 250 psig to 350 psig.

The mole % ratio of comonomer to ethylene in a reactor when producing the polyethylene of the present disclosure can be 0.005 to 0.030, or alternatively 0.010 to 0.025.

The ratio of ppm hydrogen to mole % ethylene in a reactor when producing the polyethylene of the present disclosure can be 3.0 to 5.5, or alternatively 3.5 to 5.0.

Polyethylene Films

The polyethylene of the present disclosure can be used for producing films. The film can be formed by any known process, but is preferably formed by "blowing" in a blown film process. The final film may be a single layer film comprising the polyethylene of the present disclosure as a blend with other polymers, especially other polyolefins, or consisting essentially of the polyethylene of the present disclosure and common additives such as antioxidants, fillers, etc. The film may also comprise two, three, four, five or more layers where any one or more of the layers may comprise or consist essentially of the polyethylene of the present disclosure. When a layer of the film comprises polyethylene of the present disclosure, it may be as a blend with other polyolefins such as low density polyethylene, linear low density polyethylene, high density polyethylene, polypropylene homopolymer, polypropylene copolymer, and combinations thereof.

In a typical process, the polyethylene melt is extruded through a die such as an annular slit die, usually vertically, to form a thin walled tube. Cooling, preferably in the form of positive air pressure, is introduced via a device in the center of the die to blow up the tube like a balloon. Cooling can also be effectuated or assisted by other means such as external (to the film) devices, and the air may be nitrogen/oxygen or other gases or mixtures of gases or liquids. For instance, mounted on top of the die, a high-speed air ring blows onto the exterior of the hot film to cool it. The cooling may occur at some adjustable distance from the die, which is typically at least 1 cm from the die from which the melt extrudes. The tube of film can then continue upwards or away from the die in a "machine direction" (MD), continually cooling, until it may pass through nip rolls where the tube is flattened to create what is known as a "lay-flat" tube of film. This lay-flat or collapsed tube can then be taken back down the extrusion "tower" via more rollers. On higher output lines, the air inside the bubble is also exchanged. This is known as IBC (Internal Bubble Cooling).

More particularly in the blown film process the ingredients used to form the film are added in any desirable form, preferably as granules, in a hopper which feeds the material to one or more extruders where the materials are melt blended at a desirable temperature through shear forces and/or heating. The molten material is then fed, with or without filtering, to a die, which is also heated to a desired temperature such as 180° C. to 220° C. and then forced from the die in a direction away from the die at least in part by force of blown air. The cooling of the forming film takes place as the film moves away from the die, and preferably a high-speed air ring that blows air that is at least 10° C., alternatively at least 20° C., cooler than the surrounding air facilitates that cooling. Preferably, the surrounding temperature in the area of the forming film is 20° C. to 60° C., alternatively 30° C. to 50° C. Most preferably, the forming film is cylindrical and the air ring forms a ring round the cooling tube that blows air concentrically around the film. The air preferably blows against the outside of the film, most preferably around the entire circumference formed by the film. The distance of the device from the die opening can be made to vary to allow a "relaxation time" for the hot film to gradually cool prior to being exposed to the cooling air from the cooling device. There is also air blown internally that both cools and blows the film up like a balloon. The film starts to expand where it eventually cools and crystallizes to form finished blow film where the finished film is eventually isolated by various means such as by rollers, nips, etc.

Then, the lay-flat film is either kept as such or the edges of the lay-flat are slit off to produce two flat film sheets and wound up onto reels. Articles such as bags can be made from such lay-flat films. In this regard, if kept as lay-flat, the tube of film is made into bags by sealing across the width of film and cutting or perforating to make each bag. This is performed either in line with the blown film process or at a later stage.

Preferably, the expansion ratio between the die and blown tube of film would be 1.5 times to 4 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film that is drawn down along the extrusion direction only.

Preferably, the die used in the formation of the films herein is designed such that the die opening, through which the molten polyolefin extrudes, is in the form of a ring and the molten polyolefin emanating therefrom is in the form of a continuous tube. The Die Factor Rate at which the film is formed is within a range from 10 lb/in-hr (0.56 kg/mm-hr) to 40 lb/in-hr (2.25 kg/mm-hr), or alternatively 15 lb/in-hr (0.84 kg/mm-hr) to 26 lb/in-hr (1.46 kg/mm-hr); and preferably the Maximum Rate of extrusion is within a range from 350 lb/hr (159 kg/hr) to 500 lb/hr (227 kg/hr). Note that for the "Die Factor" there is one more difference besides the units. In the English unit, the die dimension is the die circumference, while in the metric unit, the die dimension is the die diameter.

A film comprising polyethylene of the present disclosure or consisting essentially of polyethylene of the present disclosure can have an average thickness within a range from 10 μm to 100 μm, alternatively 15 μm to 60 μm, or alternatively 15 to 40 μm.

A film comprising polyethylene of the present disclosure or consisting essentially of polyethylene of the present disclosure can have a 1% Secant flexural modulus in the machine direction (MD) of 25,000 psi to 45,000 psi, or alternatively 30,000 psi to 45,000 psi. Higher values for the 1% Secant flexural modulus in the machine direction indicate higher toughness in the film.

A film comprising polyethylene of the present disclosure or consisting essentially of polyethylene of the present disclosure can have a 1% Secant flexural modulus in the transverse direction (TD) (perpendicular to the MD within the plane of the film) of 30,000 psi to 50,000 psi, or alternatively 35,000 psi to 50,000 psi. Higher values for the 1% Secant flexural modulus in the transverse direction indicate higher toughness in the film.

A film comprising polyethylene of the present disclosure or consisting essentially of polyethylene of the present disclosure can have a tensile yield strength in the MD of 1,000 psi to 2,000 psi, or alternatively 1,500 psi to 2,000 psi.

A film comprising polyethylene of the present disclosure or consisting essentially of polyethylene of the present disclosure can have a tensile yield strength in the TD of 1,000 psi to 2,500 psi, or alternatively 1,500 psi to 2,500 psi.

A film comprising polyethylene of the present disclosure or consisting essentially of polyethylene of the present disclosure can have an elongation at yield in the MD of 5% to 12%, or alternatively 7% to 12%.

A film comprising polyethylene of the present disclosure or consisting essentially of polyethylene of the present disclosure can have an elongation at yield in the TD of 4% to 9%, or alternatively 5% to 9%.

A film comprising polyethylene of the present disclosure or consisting essentially of polyethylene of the present disclosure can have tensile strength in the MD of 8,000 psi to 12,000 psi, or alternatively 9,000 psi to 12,000 psi.

A film comprising polyethylene of the present disclosure or consisting essentially of polyethylene of the present disclosure can have tensile strength in the TD of 6,000 psi to 10,000 psi, or alternatively 7,500 psi to 10,000 psi.

A film comprising polyethylene of the present disclosure or consisting essentially of polyethylene of the present disclosure can have an elongation at break in the MD of 400% to 550%, or alternatively 450% to 550%.

A film comprising polyethylene of the present disclosure or consisting essentially of polyethylene of the present disclosure can have an elongation at break in the TD of 500% to 700%, or alternatively 550% to 700%.

A film comprising polyethylene of the present disclosure or consisting essentially of polyethylene of the present disclosure can have an Elmendorf tear in the MD of 200 g to 350 g, or alternatively 200 g to 350 g. Higher values for the Elmendorf tear in the machine direction indicate higher toughness in the film.

A film comprising polyethylene of the present disclosure or consisting essentially of polyethylene of the present disclosure can have an Elmendorf tear in the TD of 450 g to 625 g, or alternatively 500 g to 625 g. Higher values for the Elmendorf tear in the transverse direction indicate higher toughness in the film.

A film comprising polyethylene of the present disclosure or consisting essentially of polyethylene of the present disclosure can have a haze of 5% to 15%, or alternatively 7% to 12%.

A film comprising polyethylene of the present disclosure or consisting essentially of polyethylene of the present disclosure can have a gloss in the MD of 50% to 70%, or alternatively 55% to 67%.

A film comprising polyethylene of the present disclosure or consisting essentially of polyethylene of the present disclosure can have a gloss in the TD of 50% to 70%, or alternatively 55% to 70%.

A film comprising polyethylene of the present disclosure or consisting essentially of polyethylene of the present disclosure can have a Dart Drop value of 200 g/mil to 1,000 g/mil, or alternatively 350 g/mil to 1,000 g/mil.

A film comprising polyethylene of the present disclosure or consisting essentially of polyethylene of the present disclosure can have a seal initiation temperature at 1 N force of 100° C. to 120° C., or alternatively 105° C. to 115° C.

A film comprising polyethylene of the present disclosure or consisting essentially of polyethylene of the present disclosure can have a maximum hot tack force of 5 N to 15 N, preferably 7 N to 15 N.

When referring to a polyethylene or polyethylene film herein, in any embodiment when the phrase "consists essentially of" is used that means that the polyethylene, or film made of the polyethylene, includes less than 5 wt %, or 4 wt %, or 3 wt %, or 2 wt %, or 1 wt %, by weight of the polyethylene of additives as are known in the art, such as fillers, colorants, antioxidants, anti-UV additives, curatives and cross-linking agents, aliphatic and/or cyclic containing oligomers or polymers, often referred to as hydrocarbon polyethylenes, and other additives well known in the art, and other common additives such as disclosed in WO 2009/007265.

EXAMPLE EMBODIMENTS

A first embodiment is a method comprising: reacting ethylene, a $C_3$ to $C_{12}$ α-olefin comonomer, and hydrogen in the presence of a mixed catalyst to form polyethylene comprising ethylene derived units and $C_3$ to $C_{12}$ α-olefin derived units at 0.5 wt % to 10 wt % of the polyethylene and having a reversed-co-monomer index (RCI,m) of 35 to 100, a comonomer distribution ratio (CDR-2,m) of 1.20 to 1.80, and a weight average molecular weight (Mw) to number average molecular weight (Mn) of 5 to 7; wherein the mixed catalyst comprises Compound I and Compound II or III in a Compound I to Compound II or III mole ratio of 70:30 to 90:10. The method can optionally further include one or more of the following: Element 1: wherein the first catalyst is Compound IV and the second catalyst is Compound V; Element 2: wherein a reaction temperature is 150° F. (66° C.) to 200° F. (93° C.); Element 3: wherein a reactor pressure is 200 psig to 400 psig; Element 4: wherein mole % ratio of comonomer to ethylene in a reactor is 0.005 to 0.030; Element 5: wherein a ratio of ppm hydrogen to mole % ethylene in a reactor is 3.0 to 5.5; Element 6: wherein the polyethylene has a % vinyls of 60% to 97%; Element 7: wherein the polyethylene has a % vinyls of 85% to 97%; Element 8: wherein the polyethylene has a density of 0.910 g/cm$^3$ to 0.940 g/cm$^3$, an $I_2$ value of 0.8 g/10 min to 1.5 g/10 min, an $I_{21}$ value of 15 to 25 g/10 min, and an $I_{21}/I_2$ ratio of 15 to 25; Element 9: wherein the polyethylene has one or more selected from the group consisting of: a Mw of 80,000 g/mol to 25,000 g/mol, a Mn of 10,000 g/mol to 100,000 g/mol, and a Z-average molecular weight (Mz) of 200,000 g/mol to 300,000 g/mol; Element 10: wherein the polyethylene has a Mz to Mw ratio of 2.0 to 3.0; Element 11: wherein the polyethylene has a long chain branching factor ($g'_{vis}$) of 0.9 to 1.1; Element 12: wherein the polyethylene has a $T_{75}$-$T_{25}$ value of 10° C. to 25° C.; and Element 13: the method further comprising: forming a film with a compound comprising the polyethylene. Examples of combinations include, but are not limited to, two or more of Elements 1-5 in combination; two or more of Elements 6-12 in combination; one or more of Elements 1-5 in combination with one or more of Elements 6-12 in combination; and Element 13 in combination with one or more of Elements 1-12.

Another embodiment is a film comprising: polyethylene comprising ethylene derived units and $C_3$ to $C_{12}$ α-olefin derived units at 0.5 wt % to 10 wt % of the polyethylene; and having a reversed-co-monomer index (RCI,m) of 35 to 100, a comonomer distribution ratio (CDR-2,m) of 1.20 to 1.80, and a weight average molecular weight (Mw) to number average molecular weight (Mn) of 5 to 7; wherein the film has a 1% Secant flexure modulus in a machine direction (MD) of 25,000 psi to 45,000 psi, an Elmendorf tear in the MD of 200 g to 350 g, and a Dart Drop value of 200 g/mil to 1,000 g/mil. The film can optionally further include one or more of the following: Element 6; Element 7; Element 8; Element 9; Element 10; Element 11; Element 12; Element 14: wherein the film has a tensile yield strength in the MD of 1,000 psi to 2,000 psi; Element 15: wherein the film has a 1% Secant flexure modulus in the TD of 30,000 psi to 50,000 psi; Element 16: wherein the film has a tensile yield strength in the TD of 1,000 psi to 2,500 psi; Element 17: wherein the film has an elongation at yield in the MD of 5% to 12%; Element 18: wherein the film has an elongation at yield in the TD of 4% to 9%; Element 19: wherein the film has a tensile strength in the MD of 8,000 psi to 12,000 psi; Element 20: wherein the film has a tensile strength in the TD of 6,000 psi to 10,000 psi; Element 21: wherein the film has an elongation at break in the MD of 400% to 550%; Element 22: wherein the film has an elongation at break in the TD of 500% to 700%; Element 23: wherein the film has an Elmendorf tear in the TD of 450 g to 625 g; Element 24: wherein the film has a haze of 5% to 15%; Element 25: wherein the film has a gloss in the MD of 50% to 70%; Element 26: wherein the film has a gloss in the TD of 50% to 70%; Element 27: wherein the film has a seal initiation temperature at 1 N force of 100° C. to 120° C.; and Element 28: wherein the film has maximum hot tack force of 5 N to 15 N. Examples of combinations include, but are not limited to, two or more of Elements 6-12 in combination; two or more of Elements 14-28 in combination; and one or more of Elements 6-12 in combination with one or more of Elements 14-28 in combination.

Yet another embodiment is a composition comprising: polyethylene comprising ethylene derived units and $C_3$ to $C_{12}$ α-olefin derived units at 0.5 wt % to 10 wt % of the polyethylene and having a reversed-co-monomer index (RCI,m) of 35 to 100, a comonomer distribution ratio (CDR-2,m) of 1.20 to 1.80, and a weight average molecular weight (Mw) to number average molecular weight (Mn) of 5 to 7. The film can optionally further include one or more of the following: Element 6; Element 7; Element 8; Element 9; Element 10; Element 11; and Element 12.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Syntheses

All anhydrous solvents were purchased from Fisher Chemical and were degassed and dried over molecular sieves prior to use. Deuterated solvents were purchased from Cambridge Isotope Laboratories and dried over molecular sieves prior to use. 2-chloro,4,6-dimethyl aniline, 2,6-diacetylpyridine, iron chloride, and formic acid (95-97%) were purchased from Sigma-Aldrich and used as received. The $^1$H NMR measurements were recorded on a 400 MHz Bruker spectrometer.

Synthesis of Compound IV

Synthesis of tributyl(trimethylsilylmethylcyclopentadienyl)stannane, $Bu_3Sn(Me_3SiCH_2Cp)$: To a colorless solution of chlorotributylstannane (12.55 g, 38.6 mmol, 1.00 eq.) in ether (60 mL) was added lithium (trimethylsilylmethylcyclopentadienide) (6.10 g, 38.5 mmol, 1.00 eq.) to give a cloudy, light manila mixture. The reaction was stirred 4 hours and then evaporated under vacuum leaving a soupy manila mixture. The mixture was extracted with pentane (50 mL, then 2×20 mL) and extracts filtered to give a yellow solution and manila solid. The solution was evaporated under vacuum leaving yellow liquid of tributyl(trimethylsilylmethylcyclopentadienyl)stannane 16.88 g (99%) yield. $^1$H NMR ($C_6D_6$): δ 6.08 (m, 2H), 5.56 (m, 4H), 1.99 (s, 2H), 1.51 (m, 6H), 1.33 (m, 6H), 0.92 (t, 9H), 0.83 (m, 6H), 0.09 (s, 9H).

Synthesis of (trimethylsilylmethylcyclopentadienyl)hafnium trichloride (1,2-dimethoxyethane), $(Me_3SiCH_2Cp)HfCl_3(dme)$: To a white suspension of hafnium tetrachloride (11.65 g, 36.4 mmol, 1.00 eq.) in dichloromethane (120 mL) at −35° C. was added dimethyl sulfide (6.80 g, 109 mmol, 3.01 eq.) to give a hazy, pale yellow solution. Tributyl (trimethylsilylmethylcyclopentadienyl)stannane (16.85 g, 38.2 mmol, 1.05 eq.) was added dropwise to the solution to give a hazy, amber solution. The mixture was allowed to warm to room temperature and stirred 3 hours. 1,2-dimethoxyethane (10.00 g, 109 mmol, 2.99 eq.) was then added to the reaction and the mixture was filtered to give an amber solution and a small amount of white solid. The solution was evaporated under vacuum, leaving a damp, white solid. The solid was washed with pentane (100 mL, then 3×40 mL) and dried under vacuum leaving a white powder of (trimethylsilylmethylcyclopentadienyl)hafnium trichloride (1,2-dimethoxyethane) 18.15 g (95%) yield. $^1$H NMR ($CD_2Cl_2$): δ 6.29 (t, 2H), 4.13 (br s, 4H), 3.91 (3, 6H), 2.33 (s, 2H), −0.01 (s, 9H).

Synthesis of Compound V

Synthesis of indenyl(trimethylsilylmethylcyclopentadienyl)hafnium dichloride, $Ind(Me_3SiCH_2Cp)HfCl_2$: To a white suspension of (trimethylsilylmethylcyclopentadienyl) hafnium trichloride (1,2-dimethoxyethane) (2.50 g, 4.75 mmol, 1.00 eq.) in ether (30 mL) was added lithium indenide (0.57 g, 4.75 mmol, 1.00 eq.) to give a light manila mixture. The mixture was stirred 21 hours and then evaporated under vacuum leaving manila solid. The solid was extracted with dichloromethane (25 mL, then 3×5 mL) and the extracts filtered to give a light yellow solution and white solid. The solution was evaporated under vacuum leaving light yellow solid. The solid was washed with pentane (10 mL) and dried under vacuum leaving a light yellow powder of indenyl (trimethylsilylmethylcyclopentadienyl)hafnium dichloride in 2.27 g (93%) yield. $^1$H NMR ($CD_2Cl_2$): δ 7.65 (m, 2H), 7.26 (m, 2H), 6.87 (t, 1H), 6.37 (d, 2H), 5.77 (t, 2H), 5.65 (t, 2H), 1.99 (s, 2H), −0.06 (s, 9H).

Synthesis of (tetrahydroindenyl)(trimethylsilylmethylcyclopentadienyl)hafnium dichloride, $(H_4Ind)(Me_3SiCH_2Cp)HfCl_2$ (Compound IV): To a pale yellow solution of indenyl (trimethylsilylmethylcyclopentadienyl)hafnium dichloride (1.50 g, 2.91 mmol) in dichloromethane (30 mL) was added platinum oxide (0.04 g, 0.18 mmol, 2.7 wt %) to give a brown mixture. 100 psi hydrogen was added to the mixture and the reaction was stirred vigorously for 1 hour. The reaction was vented and filtered to give a colorless solution and black solid. The solution was evaporated under vacuum leaving a white solid of (tetrahydroindenyl)(trimethylsilylmethylcyclopentadienyl)hafnium dichloride in 1.43 g yield (95%). $^1$H NMR ($CD_2Cl_2$): δ 6.23 (t, 1H), 6.15 (t, 2H), 5.88 (t, 2H), 5.67 (d, 2H), 2.85-2.92 (m, 2H), 2.59-2.66 (m, 2H), 2.09 (s, 2H), 1.77-1.80 (m, 2H), 1.60-1.63 (m, 2H), −0.02 (s, 9H).

Synthesis of 2,6-bis-[1-(2-chloro,4,6-dimethylphenylimino)ethyl]pyridine: A Solid 2,6-diacetylpyridine (5.0 g, 31 mmol) was dissolved in methanol (100 mL) and to this a solid 2-chloro,4,6-dimethyl aniline (9.537 g, 62 mmol) and formic acid (0.5 mL) were added. The resulting mixture was stirred at room temperature for 48 hours, colorless solid precipitated out during the course of reaction. Colorless crystalline solids were filtered out and washed with cold methanol. The crude materials $^1$H NMR spectrum showed are 1:1 ratio of 2,6-bis-[1-(2-chloro,4,6-dimethylphenylimino)ethyl]pyridine and starting material 2-chloro,4,6-dimethyl aniline. The desired compound was purified by column chromatography with a mixture of hexane/ethyl acetate (8:2 ratio) as eluent. Solvent removal resulted colorless crystalline solid of 2,6-bis-[1-(2-chloro,4,6-dimethylphenylimino)ethyl]pyridine in 2.5 g (18.6%) yield. $^1$H NMR (400 MHz, $CD_2Cl_2$): δ 2.06 (6H, s, $CH_3$ side arms), 2.29 (6H, s, $CH_3$), 2.31 (6H, s, $CH_3$), 6.99 (2H, s, Ar—CH), 7.11 (2H, s, Ar—CH), 7.95 (1H, t, Ar—CH), 8.47 (2H, d, Ar—CH) ppm.

Synthesis of 2,6-bis-[1-(2-chloro,4,6-dimethylphenylimino)ethyl]pyridine iron dichloride (Compound V): A solid pro-ligand, 2,6-bis-[1-(2-chloro,4,6-dimethylphenylimino)ethyl]pyridine, was dissolved in THF (40 mL) and cooled to −25° C. To the mixture, a solid pre-dried iron chloride was added. The resulting mixture was stirred overnight at room temperature. The resulting mixture's color turned to blue from brown during the course of reaction, and the iron complex was precipitated out as blue solids. The blue iron compound was filtered out and washed with hexane. The crude materials were further re-dissolved in dichloromethane to remove any insoluble iron containing impurities and ionic compounds formed during the course of reaction, which could not been identified by $^1$H NMR measurements because of their faster relaxation rate (paramagnetic nature) on NMR timescale. Solvent removal under reduced pressure resulted a blue crystalline solid of 2,6-bis-[1-(2-chloro,4,6-dimethylphenylimino)ethyl]pyridine iron dichloride in 1.89 g (81.9%) yield. $^1$H NMR (400 MHz, $CD_2Cl_2$): δ −23.2, −21.0, 3.7, 9.1, 12.2, 15.3, 18.4, 19.3, 22.0, 22.2, 32.9, 33.9, 81.9, 84.2 (bs) ppm.

Preparation of Supported Catalyst

A 47.0 g amount of ES70 875C calcined silica (available from PQ Corporation) was added to a CELESTIR™ vessel. Next, 100 mL toluene and 58.75 g methylaluminoxane (MAO) 30% in toluene was added and stirred for two hours. (Tetrahydroindenyl)(trimethylsilylmethylcyclopentadienyl) hafnium dichloride (0.548 g, 1.14 mmol) and 2,6-bis[1-(2-chloro-4,6-dimethylphenylimino)ethyl]pyridine iron(II) dichloride (0.162 g, 0.29 mmol) were then added to toluene (20 mL) and stirred until dissolved and then added to the CELESTIR™ vessel and stirred for 3 hours. The slurry was filtered, washed with toluene (1×20 mL), and then washed hexane (2×30 mL). The supported catalyst was then dried under vacuum for 18 hours to yield 60.5 g of light yellow silica (22 micromol/per gram catalyst loading).

Polyethylene Synthesis

Three polyethylene samples were prepared according to the conditions in Table 2 with hexene as the comonomer using the supported catalyst above.

TABLE 2

| Example No. | 1 | 2 | 3 |
|---|---|---|---|
| $H_2$ conc. (molppm) | 320 | 259 | 305 |
| Hydrogen flow (sccm) | 13.01 | 9.45 | 10.80 |
| $C_6/C_2$ ratio (mol %/mol %) | 0.013 | 0.014 | 0.018 |
| Comonomer conc. (mol %) | 0.93 | 0.99 | 1.24 |
| $C_2$ conc. (mol %) | 70.0 | 69.9 | 70.0 |
| Comonomer/$C_2$ flow ratio | 0.040 | 0.040 | 0.054 |
| $C_2$ flow (g/hr) | 1876 | 1861 | 1935 |
| $H_2/C_2$ ratio (ppm/mol %) | 4.6 | 3.7 | 4.4 |
| Rx. pressure (psig) | 300 | 300 | 300 |
| Reactor temp (° F.) | 185 | 185 | 185 |
| Avg. bedweight (g) | 2369 | 2358 | 2349 |
| Production (g/hr) | 525 | 469 | 545 |
| Residence time (hr) | 4.5 | 5.0 | 4.3 |
| $C_2$ utilization ($gC_2/gC_2$ poly) | 3.57 | 3.97 | 3.55 |
| Avg. velocity (ft/s) | | | 1.40 |
| Catalyst slurry feed (ml/hr) | 1.4 | 1.4 | 1.4 |
| Catalyst slurry conc. (wt. frac.) | 0.1 | 0.1 | 0.1 |
| Catalyst slurry density (g/ml) | 0.88 | 0.88 | 0.88 |
| Trim feed (ml/hr) | 0.00 | 0.00 | 0.00 |
| Catalyst feed (g/hr) | 0.119 | 0.125 | 0.125 |
| Catalyst activity (g poly/g cat) | 4401 | 3751 | 4356 |

The properties of the three polyethylene samples are provided in Table 3.

TABLE 3

| Example No. | 1 | 2 | 3 |
|---|---|---|---|
| $I_2$ (g/10 min) | 1.14 | 0.91 | 0.89 |
| $I_{21}$ (g/10 min) | 20.05 | 18.54 | 18.37 |
| $I_{21}/I_2$ | 17.58 | 20.27 | 20.58 |
| Gradient Density | 0.9223 | 0.9261 | 0.9209 |
| Bulk Density | 0.4052 | 0.3896 | 0.3996 |

Films

Without being limited by theory, it is believed that the unbridged hafnocene containing a hydrogenated indenyl is a good hexene incorporator to the polyethylene product, and the iron imino pyridine catalyst is a poor hexene incorporator to the polyethylene product. This results in a polyethylene composition with a BOCD.

The various polyethylenes produced above were compounded with the following additives: 500 ppm of IRGANOX™ 1076 (sterically hindered primary phenolic antioxidant stabilizer, available from BASF), 1,000 ppm of IRGAFOS™ 168 (a hydrolytically stable organo-phosphite processing stabilizer, available from BASF), and 600 ppm of DYNAMAR™ FX5920A (a polymer processing aid, available from Dyneon). The compounding was done on a 27 mm LEISTRITZ™ ZSE-27 twin-screw extruder with a length to diameter (L/D) ratio of 40 and at 250 rpm screw speed. Typical, melt temperatures of these polyethylenes were 224° C.

The properties of the resultant compounds are provided in Table 4.

TABLE 4

| Example No. | 1 | 2 | 3 |
|---|---|---|---|
| $I_2$ (g/10 min) | 1.09 | 0.92 | 0.89 |
| $I_{21}$ (g/10 min) | 20.0 | 19.1 | 18.7 |
| $I_{21}/I_2$ | 18.3 | 20.7 | 21.1 |
| Compound density (g/cm$^3$) | 0.9223 | 0.9261 | 0.9209 |

The compounds were used to produce blown films according to the conditions in Table 5.

TABLE 5

| Example No. | 1 | 2 | 3 |
|---|---|---|---|
| Nominal Gauge (mil) | 1 | 1 | 1 |
| Die Gap (mil) | 60 | 60 | 60 |
| Lay Flat (in) | 7.875 | 7.875 | 7.875 |
| BUR | 2.51 | 2.51 | 2.51 |
| Press. (in $H_2O$) | 6 | 6 | 6 |
| Temp. of chilled air] for bubble cooling of film (° F.) | 56 | 56 | 56 |
| % air | 61 | 61 | 64 |
| Line Speed (fpm) | 100 | 101 | 100 |
| Freeze-line height (in) | 11.25 | 11.25 | 10.75 |
| Rate (lb/in die) | 8 | 8 | 8 |
| Melt (° F.) | 350 | 349 | 351 |
| Head Pressure (psi) | 4035 | 4150 | 4240 |
| % motor load | 51 | 52 | 50 |
| RPM | 30 | 30 | 30 |

The resultant films have the properties provided in Table 6.

TABLE 6

| Example No. | 1 | 2 | 3 |
|---|---|---|---|
| Gauge Mic (mils) | | | |
| Average | 1.14 | 1.09 | 1.1 |
| Low | 1.04 | 0.93 | 0.96 |
| High | 1.27 | 1.4 | 1.2 |
| 1% Secant flexure modulus (psi) | | | |
| MD | 32973 | 42177 | 34471 |
| TD | 36767 | 47820 | 41789 |
| Average | 34870 | 44999 | 38130 |
| Tensile Yield Strength (psi) | | | |
| MD | 1518 | 1835 | 1658 |
| TD | 1663 | 2016 | 1787 |
| Elongation @ Yield (%) | | | |
| MD | 6.3 | 7.4 | 9.6 |
| TD | 7.4 | 5.2 | 6.3 |
| Tensile Strength (psi) | | | |
| MD | 9010 | 9158 | 10670 |
| TD | 8537 | 7638 | 8972 |
| Elongation @ Break (%) | | | |
| MD | 517 | 507 | 472 |
| TD | 688 | 593 | 623 |
| Elmendorf Tear | | | |
| MD (g) | 324.6 | 259.5 | 268 |
| TD (g) | 519.7 | 590.7 | 518.2 |
| Haze | | | |
| Haze (%) | 7.9 | 11.8 | 11 |
| Haze- internal (%) | 3.3 | 4.0 | 3.9 |
| Gloss | | | |
| MD | 65.8 | 56.4 | 63.0 |
| TD | 68.4 | 54.7 | 62.9 |
| Dart Drop (Phenolic, Method A) | | | |
| Dart Drop (g) | 308 | 422 | 926 |
| Dart Drop (g/mil) | 270.2 | 387.2 | 841.8 |
| Puncture (Btec probe, B) | | | |
| Peak Force (lbs) | 14.0 | 13.0 | 13.0 |
| Peak Force (lbs/mil) | 12.3 | 11.9 | 11.8 |
| Break Energy (in-lbs) | 43.7 | 35.4 | 36.4 |
| Break Energy (in-lbs/mil) | 38.4 | 32.5 | 33.1 |
| 1 mil Heat Seal and Hot Tack | | | |
| Seal Initiation Temperature at 1N force (° C.) | 106.6 | 114.0 | 112.2 |
| Seal Temperature at 5N force (° C.) | 112.0 | 117.5 | 116.7 |
| Maximum Seal force (N) | 13.3 | 12.6 | 12.2 |
| Nominal Seal Strength (MPa) | 18.0 | 18.0 | 17.3 |
| Peal-Break transition temperature (° C.) | 117.5 | 122.5 | 122.5 |
| Hot Tack Initiation Temperature at 1N force (° C.) | 106.1 | 110.4 | 101.5 |
| Hot Tack Temperature at 5N force (° C.) | 116.6 | 119 | 115.8 |
| HotTackWindow@5N (° C.) | 36.3 | 34.9 | 30.3 |
| Maximum Hot Tack force (N) | 9.1 | 7.4 | 9.0 |
| 4D GPC Analysis | | | |
| $I_2$ (g/10 min) | 1.09 | 0.92 | 0.89 |
| $I_{21}/I_2$ | 18.3 | 20.7 | 21.1 |
| Mw (g/mol) | 111035 | 114593 | 116085 |
| Mn (g/mol) | 22183 | 17530 | 18048 |
| Mz (g/mol) | 241639 | 284576 | 301500 |

TABLE 6-continued

| Example No. | 1 | 2 | 3 |
|---|---|---|---|
| Mz/Mn | 10.9 | 16.2 | 16.7 |
| Mw/Mn | 5.01 | 6.53 | 6.43 |
| Mz/Mw | 2.17 | 2.48 | 2.60 |
| $g'_{vis}$ | 1.0 | 1.0 | 1.0 |
| RCI, m (kg/mol) | 43.6 | 71.1 | 88.1 |
| CDR2, m | 1.33 | 1.41 | 1.33 |
| Hexene (%) | 5.89 | 5.31 | 7.72 |
| TREF Analysis | | | |
| $T_{75}$-$T_{25}$ (° C.) | 18.2 | 12.46 | 15.35 |

The polymer products prepared above were analyzed by $^1$H NMR to determine internal (I) and terminal (T) unsaturations using the techniques described herein. The labels "Vy1", "Vy2" and "Vy5" refer to proton resonances attributed to the protons on double bonds within the polymer backbone.

TABLE 7

| Polymer Product $^1$H NMR End Group Analysis | 1 | 2 | 3 |
|---|---|---|---|
| Vy1 and Vy2 (I) | 0.04 | 0.01 | 0.00 |
| Vy5 (T) | 0.01 | 0.01 | 0.00 |
| Tri-substituted olefins (I) | 0.03 | 0.01 | 0.01 |
| Vinyls (T) | 0.15 | 0.41 | 0.35 |
| Vinylidenes (T) | 0.01 | 0.00 | 0.01 |
| % vinyls | 62.5 | 93.2 | 94.6 |
| Total unsaturations/1000 carbons | 0.24 | 0.44 | 0.37 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:

reacting ethylene, a $C_3$ to $C_{12}$ α-olefin comonomer, and hydrogen in the presence of a mixed catalyst to form polyethylene comprising ethylene derived units and $C_3$ to $C_{12}$ α-olefin derived units at 0.5 wt % to 10 wt % of the polyethylene, wherein the polyethylene has:

a reversed-co-monomer index (RCI,m) of 35 to 100;

a comonomer distribution ratio (CDR-2,m) of 1.20 to 1.80; and a weight average molecular weight (Mw) to number average molecular weight (Mn) of 5 to 7;

wherein the mixed catalyst comprises Compound IV and Compound V in a Compound IV and Compound V mole ratio of 70:30 to 90:10:

Compound IV

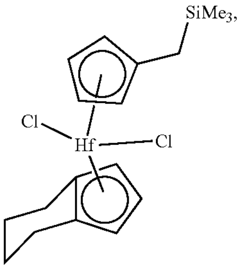

Compound V

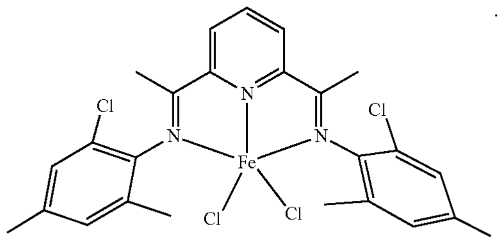

2. The method of claim 1, wherein the polyethylene has a % vinyls of 60% to 97%.

3. The method of claim 1, wherein the polyethylene has a % vinyls of 85% to 97%.

4. The method of claim 1, wherein the polyethylene has a density of 0.910 g/cm$^3$ to 0.940 g/cm$^3$, an $I_2$ value of 0.8 g/10 min to 1.5 g/10 min, an $I_{21}$ value of 15 to 25 g/10 min, and an $I_{21}/I_2$ ratio of 15 to 25.

5. The method of claim 1, wherein reacting is carried out at one or both of the following conditions: a reaction temperature of 150° F. (66° C.) to 200° F. (93° C.); and a reaction pressure of 200 psig to 400 psig.

6. The method of a claim 1, wherein reacting is carried out in a reactor wherein mole % ratio of comonomer to ethylene in the reactor is 0.005 to 0.030.

7. The method of claim 1, wherein reacting is carried out in a reactor wherein a ratio of ppm hydrogen to mole % ethylene in the reactor is 3.0 to 5.5.

8. The method of claim 1, wherein the polyethylene has one or more of the following properties:

(a) a Mw of 80,000 g/mol to 250,000 g/mol;

(b) a Mn of 10,000 g/mol to 100,000 g/mol;

(c) a Z-average molecular weight (Mz) of 200,000 g/mol to 300,000 g/mol;

(d) a long chain branching factor ($g'_{vis}$) of 0.9 to 1.1; and (e) a $T_{75}$-$T_{25}$ value of 10° C. to 25° C.

9. The method of claim 8, wherein the polyethylene has all of the properties (a)-(f).

10. The method of claim 1, further comprising forming a film with a compound comprising the polyethylene.

11. A film comprising:

polyethylene comprising ethylene derived units and $C_3$ to $C_{12}$ α-olefin derived units at 0.5 wt % to 10 wt % of the polyethylene wherein the polyethylene has a reversed-co-monomer index (RCI,m) of 35 to 100;

a comonomer distribution ratio (CDR-2,m) of 1.20 to 1.80;

a density of 0.910 g/cm$^3$ to 0.940 g/cm$^3$, an $I_2$ value of 0.8 g/10 min to 1.5 g/10 min, an $I_{21}$ value of 15 to 25 g/10 min, and an $I_{21}/I_2$ ratio of 15 to 25; and a weight average molecular weight (Mw) to number average molecular weight (Mn) of 5 to 7;

wherein the film has a 1% secant flexural modulus in a machine direction (MD) of 30,000 psi to 45,000 psi, an Elmendorf tear in the MD of 200 g to 350 g, and a dart drop value of 200 g/mil to 1,000 g/mil.

12. The film of claim 11, wherein the film has a tensile yield strength in the MD of 1,000 psi to 2,000 psi.

13. The film of claim 12, wherein the polyethylene has one or more of the following properties:

(a) a Mw of 80,000 g/mol to 250,000 g/mol;

(b) a Mn of 10,000 g/mol to 100,000 g/mol;

(c) a Z-average molecular weight (Mz) of 200,000 g/mol to 300,000 g/mol;

(d) a long chain branching factor ($g'_{vis}$) of 0.9 to 1.1; and (e) a $T_{75}$-$T_{25}$ value of 10° C. to 25° C.

14. The film of claim 13, wherein the polyethylene has all of the properties (a)-(f).

15. A composition comprising:

polyethylene comprising ethylene derived units and $C_3$ to $C_{12}$ α-olefin derived units at 0.5 wt % to 10 wt % of the polyethylene and having a reversed-co-monomer index (RCI,m) of 55 to 70, a comonomer distribution ratio (CDR-2,m) of 1.20 to 1.80, and a ratio of weight average molecular weight to number average molecular weight (Mw/Mn) of 5 to 7.

16. The composition of claim 15, wherein the polyethylene further has one or more of the following properties:

(a) a Mw of 80,000 g/mol to 250,000 g/mol;

(b) a Mn of 10,000 g/mol to 100,000 g/mol;

(c) a Z-average molecular weight (Mz) of 200,000 g/mol to 300,000 g/mol;

(d) a long chain branching factor ($g'_{vis}$) of 0.9 to 1.1; and (e) a $T_{75}$-$T_{25}$ value of 10° C. to 25° C.

17. The composition of claim 16, wherein the polyethylene has all of the properties (a)-(f).

* * * * *